United States Patent
Cazenave

(10) Patent No.: US 12,208,420 B1
(45) Date of Patent: Jan. 28, 2025

(54) AIR ATTACHMENT ON HARVESTER ELEVATOR FOR INCREASED CLEANING

(71) Applicant: DEERE & COMPANY, Moline, IL (US)

(72) Inventor: Blain J. Cazenave, Vacherie, LA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/477,700

(22) Filed: Sep. 29, 2023

(51) Int. Cl.
| | | |
|---|---|---|
| *B07B 4/08* | (2006.01) | |
| *B07B 11/06* | (2006.01) | |
| *B65G 47/34* | (2006.01) | |

(52) U.S. Cl.
CPC ............ *B07B 4/08* (2013.01); *B07B 11/06* (2013.01); *B65G 47/34* (2013.01); *B65G 2201/0202* (2013.01)

(58) Field of Classification Search
CPC ........... B07B 4/08; B07B 11/00; B65G 47/34; B65G 2201/0202
USPC ........................................................ 209/138
See application file for complete search history.

(56) References Cited

U.S. PATENT DOCUMENTS

| | | | | |
|---|---|---|---|---|
| 2,716,322 A | * | 8/1955 | Pool ...................... | A01D 45/10 56/157 |
| 4,572,741 A | * | 2/1986 | Mason ...................... | C13B 5/04 127/2 |
| 5,421,147 A | * | 6/1995 | Holden ................ | A01D 51/002 56/16.5 |
| 6,076,340 A | * | 6/2000 | Fowler ................... | A01D 45/10 56/13.3 |
| 8,591,301 B2 | * | 11/2013 | Redekop .............. | A01D 45/028 460/100 |
| 9,333,538 B1 | * | 5/2016 | Bogner .................... | C13B 20/16 |
| 2009/0124309 A1 | * | 5/2009 | Redekop ................ | A01D 45/02 460/100 |

FOREIGN PATENT DOCUMENTS

| | | | | |
|---|---|---|---|---|
| CN | 106900277 A | | 6/2017 | |
| CN | 107530713 B | * | 6/2021 | ............... B07B 1/22 |

* cited by examiner

*Primary Examiner* — Terrell H Matthews
(74) *Attorney, Agent, or Firm* — Taft Stettinius & Hollister LLP; Stephen F. Rost

(57) ABSTRACT

A cleaning and debris management system that separates debris from billet leaf bundles in a harvester. The system includes an elevator and one or more air sources. The elevator includes first and second sections that meet at transition points. The air sources include upward and lateral sources located at the transition points to blow air through the bundles as they move across the transition points from the first to the second section. The air blown by the air sources spreads out the bundles and separates the debris. The elevator can cause the bundles to become airborne at the transition points, and the air sources can blow air through the airborne bundles. The system can include a hood where an air source blows air into a base and out an outlet of the hood to blow some of the debris out of the outlet.

20 Claims, 12 Drawing Sheets

AIR ATTACHMENT ON HARVESTER ELEVATOR FOR INCREASED CLEANING

FIELD OF THE DISCLOSURE

The present disclosure relates to agricultural harvesting machines, and more specifically relates to crop cleaning systems for harvest elevators.

BACKGROUND

Agricultural harvesters usually clean the harvested material by separating it into desired and/or edible crop material and unwanted waste material. This cleaning process can often be difficult. For example, sugar cane harvesters include separators, such as fans, to blow away the waste material. However, the harvested material with both wanted and unwanted material often comes into the cleaning chamber as a coupled billet leaf unit which makes it difficult for existing methods to extract the unwanted material efficiently.

With the inception of yield monitors, more focus has been placed on sugarcane cleaning and billet loss reductions since farmers are now more aware of the inefficiencies of cleaning sugarcane. Traditional methods of sugarcane cleaning which include using an axial flow fan near the chopping apparatus and near the material discharge area on the end of the elevator have been improved with minimal potential for future improvements. Large expanses of space exist between these material cleaning thresholds that allow for supplemental cleaning strategies to be implemented to assist in the cleaning process. A disadvantage being that the billet/leaf units remain in a static state as they traverse the elevator towards the haul out trailer. Billet leaf separation primarily occurs when the billet leaf unit is in a dynamic state.

It would be desirable, as the harvested material travels along the elevator, to introduce points where the harvested material is put into a dynamic state. Once dynamic, additional cleaning mechanisms can be introduced to blow away residual waste matter to improve on the cleaning capacity of traditional harvester cleaning systems.

SUMMARY

A cleaning and debris management system is disclosed that separates debris from billet leaf bundles in a harvester. The cleaning and debris management system includes an elevator and an upward air source. The elevator includes a first section, a second section and a transition point between the first and second sections. The upward air source is located at the transition point below at least a portion of the elevator, and is configured to blow air through the billet leaf bundles from beneath as the billet leaf bundles move across the transition point from the first section to the second section of the elevator. The air blown by the upward air source is configured to spread out the billet leaf bundles and separate the debris from the billet leaf bundles. The elevator can cause the billet leaf bundles to become airborne as the billet leaf bundles move across the transition point from the first section to the second section of the elevator, and the upward air source can blow air through the billet leaf bundles while the billet leaf bundles are airborne.

The elevator can include a first conveyor in the first section, and a second conveyor in the second section, where the second conveyor is separate from the first conveyor. The billet leaf bundles fall from the first conveyor onto the second conveyor as the billet leaf bundles move across the transition point from the first section to the second section of the elevator. The upward air source blows air through the billet leaf bundles as the billet leaf bundles fall from the first conveyor onto the second conveyor.

The elevator can include a conveyor that extends across both the first and second sections of the elevator. The conveyor can have a first slope in the first section and a second slope in the second section, where the first slope is greater than the second slope such that the billet leaf bundles become airborne as they move across the transition point from the first section to the second section of the elevator. The upward air source can blow air through the billet leaf bundles as the billet leaf bundles are airborne at the transition point.

The cleaning and debris management system can also include a lateral air source located at the transition point that blows air laterally across the elevator from one of the right and left sides of the elevator to the other of the right and left sides of the elevator. The lateral air source can blow air across the billet leaf bundles while the billet leaf bundles are airborne at the transition point to spread out the billet leaf bundles and separate and remove debris.

The cleaning and debris management system can also include a hood that includes a base and an outlet, where the base is coupled to the elevator. The upward air source can blow air into the base and out the outlet of the hood such that at least a portion of the debris separated from the billet leaf bundles is blown out of the outlet of the hood. The hood can include a directable upper section coupled to the base, where the outlet is part of the directable upper section. The directable upper section of the hood can be movable to direct the outlet and the portion of the debris blown out of the outlet in a desired direction. The base of the hood can also include an irregular-shaped edge configured to hit the billet leaf bundles as the billet leaf bundles enter the hood.

The cleaning and debris management system can include a first lateral air source and a hood that includes a first outlet. The first lateral air source can be configured to blow air across the billet leaf bundles while the billet leaf bundles transition from the first conveyor onto the second conveyor and to blow the debris separated from the billet leaf bundles out the first outlet of the hood. The cleaning and debris management system can also include a second lateral air source and the hood can include a second outlet. The second lateral air source can be configured to blow air across the billet leaf bundles while the billet leaf bundles transition from the first conveyor onto the second conveyor and to blow the debris separated from the billet leaf bundles out the second outlet of the hood.

The cleaning and debris management system can include a hood with an outlet and a deflector plate. The first conveyor can be configured to propel the billet leaf bundles into the deflector plate as the billet leaf bundles transition from the first conveyor onto the second conveyor to agitate the bundles and to separate the debris from the billet leaf bundles. In addition, the air source can blow air through the billet leaf bundles when they hit the deflector plate to blow at least a portion of the debris separated from the billet leaf bundles out of the outlet of the hood.

The upward air source can be a charged air source. The charged air source can include a compressed air supply and outlet nozzles coupled to the compressed air supply, where the outlet nozzles blow air supplied by the compressed air supply. Each of the outlet nozzles can include a directable head that blows air in a desired direction: The charged air source can include an adjustment arm to adjust the directable heads of all of the outlet nozzles of the charged air source: The upward air source can be a cross flow fan.

A cleaning and debris management system is disclosed that separates debris from billet leaf bundles in a harvester. The cleaning and debris management system includes an elevator, air sources and a charged air supply. The elevator includes multiple sections and transition points, where two sections meet at each of the transition points. The air sources blow air through the billet leaf bundles at the transition points as the billet leaf bundles move across the transition points along the elevator. The charged air supply is coupled to each of the air sources, and supplies charged air to each of the air sources to blow air through the billet leaf bundles at the transition points. The air sources can include upward and lateral air sources. Each of the upward and lateral air sources can be located at an associated one of the transition points. Each of the upward air sources can blow air through the billet leaf bundles from beneath as the billet leaf bundles move across the associated transition point, and each of the lateral air sources can blow air across the billet leaf bundles while the billet leaf bundles move across the associated transition point. The direction of the air blown by each of the air sources can be adjustable.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
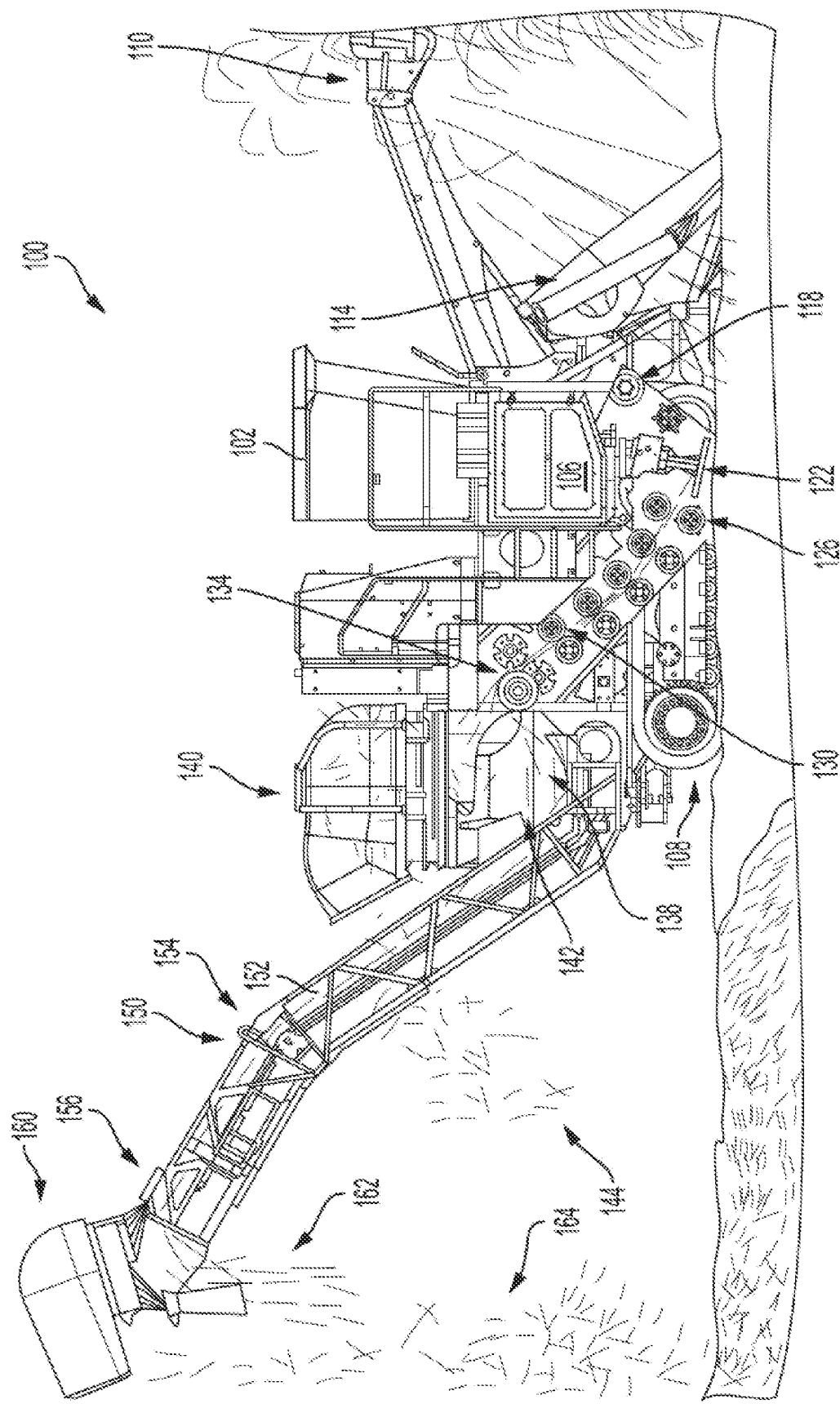
FIG. 1 illustrates an exemplary sugar cane harvester for harvesting rows of standing sugar cane.

FIG. 1 illustrates an exemplary sugar cane harvester 100 for harvesting rows of standing sugar cane. The exemplary sugar cane harvester 100 includes an operator cab 102, an engine 106, track assemblies 108, a cane topper 110, a crop divider 114, knockdown rollers 118, a base cutter 122, butt lifters 126, feed rollers 130, a chopper system 134, an elevator basket 138, a primary extractor 140, an elevator 150, and a secondary extractor 160. The engine 106 provides power for driving the track assemblies 108 and other driven components of the harvester 100. Alternatively, the harvester could have wheels or other traction devices instead of the track assemblies 108.

The operator cab 102 is mounted in a position for observing operation of the cane topper 110 and crop dividers 114. The cane topper 110 cuts off the leafy material at the top of the sugar cane, this leafy material has little or no sugar content. The crop dividers 114 help separate the rows of sugar cane plants and feed them to the knockdown rollers 118 and base cutter 122. The base cutter assembly 122 is located below the engine 106 and between the track assemblies 108 for each row of cane stalks, and knockdown rollers 118 are located ahead of the base cutter assembly 122 for orienting the cane stalks to be cut by the base cutter assemblies 122.

The cut sugar cane is then fed by the butt lifters 126 into an upwardly and rearward oriented feed path defined between pairs of butt lifters 126 and feed rollers 130. The feed rollers 130 convey the stalks to the chopper system 134 to chop the stalks into billets 142, and the billets 142 and debris then pass through the primary extractor 140. The primary extractor 140 can include a fan or other separating mechanism to help separate and expel the leafy material and other debris 144 from the billets 142 as they pass through the primary extractor 140 to the elevator basket 138 below the primary extractor chamber 140. The elevator 150 conveys billet leaf bundles 152, which includes the billets 142 and residual debris, from the elevator basket 138 to the secondary extractor 160 which can also include a fan to blow additional residual debris and leafy material 164 out from the billet leaf bundles 152. The billets and any remaining residual debris 162 can then drop from the secondary extractor 160 into a wagon.

One or more transition points 154, 156 in the elevator 150 would allow a temporary lifting point of the billet leaf bundles 152 on the slats of the elevator 150. This would suspend the billet leaf bundles 152 in the air momentarily to allow a charged air stream to further dislodge any remaining leaf trash and prepare the bundles 152 for further cleaning upstream on the elevator before entering the wagon, or before passing by the secondary extractor 160. Such transition points 154, 156 exist on current harvester elevators and it would be desirable to add an air source at one or both of the transition points 154, 156 for added cleaning of the billet leaf bundles 152. In addition, cross streams of charged air can be added to direct the dislodged debris away from the harvester/wagon and back onto the ground away from the remaining unharvested crop.

The elevator geometry can be enhanced to allow for multiple transition points and multiple charged air attachments, and in some embodiments the secondary extractor 160 can be removed from the machine and replaced by these multiple transition points and multiple charged air attachments along the elevator 150. This can improve weight distribution along the elevator 150, and decrease overall machine power consumption. Previous attempts at adding an air source to the elevator included a traditional blower system with a cross flow air stream that lacked the initial air velocity to provide the desired benefits. Such systems are bulky and difficult to place and lack the concentrated, high velocity air streams needed to remove the remaining leaf trash. Furthermore, charged air systems can be more compact and easier to place in the existing space and would add less weight compared to alternative options, such as cross flow and axial flow fans. Using charged air systems along the elevator pathway instead of a secondary extractor may also reduce field losses or billet losses that can occur when using a secondary extractor.

Figure 2:
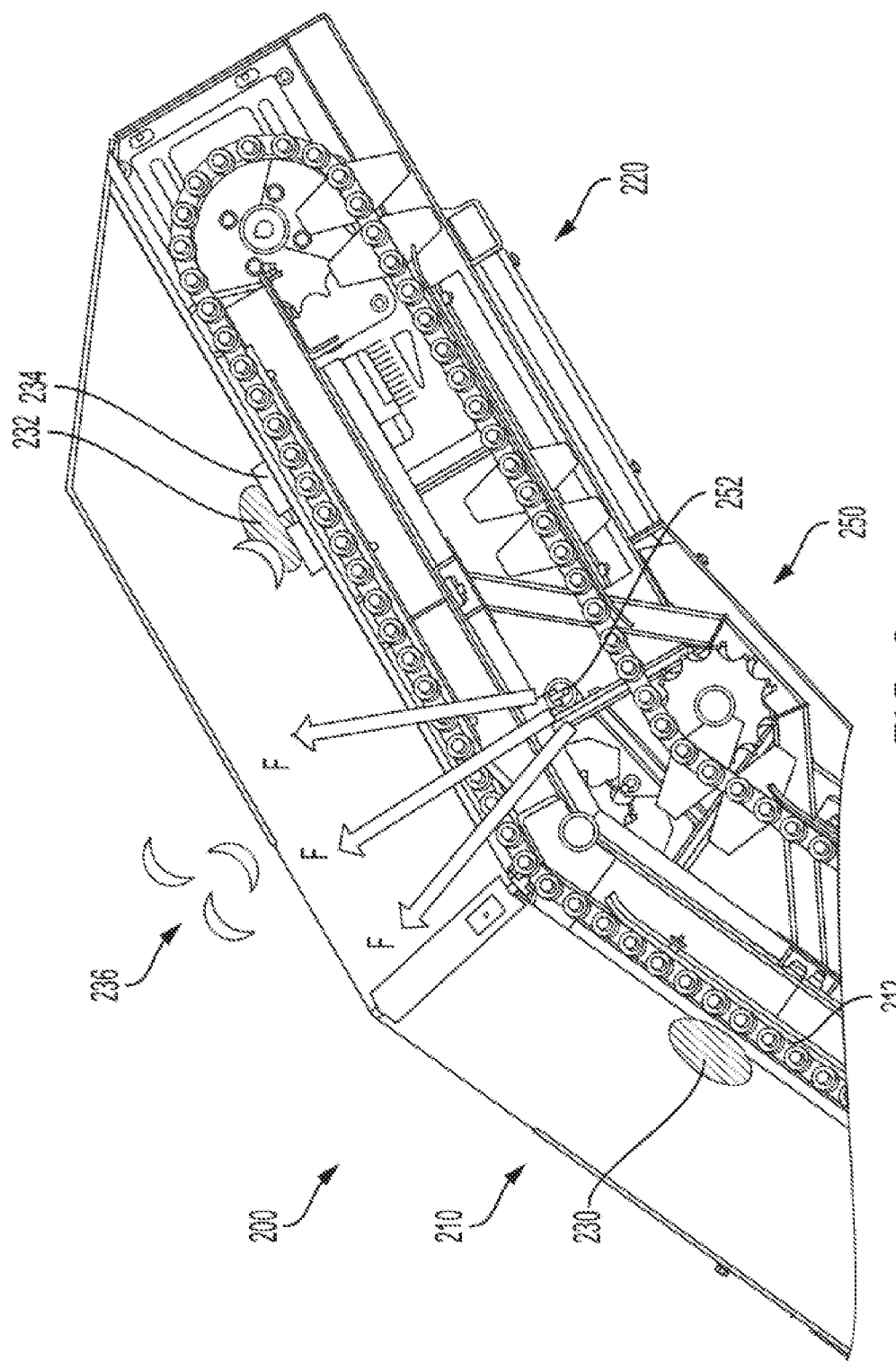
FIG. 2 illustrates an exemplary embodiment of a cleaning and debris management system with an air source on an elevator that includes a first section and a second section that meet at a transition point, where the first section has a steeper angle of ascent than the second section.

FIG. 2 illustrates an exemplary embodiment of a cleaning and debris management system with an air source 252 on an exemplary elevator 200 that includes a first section 210 and an second section 220 that meet at a transition point 250, where the first section 210 has a greater or steeper slope than the second section 220. The slope of a section of the elevator 200 means to rise (increase in vertical direction) for a fixed run (distance in horizontal direction) of that section.

Different types of conveyors, for example metal slats coupled to chains, rubber belts, etc. can be used for the conveyor 212 in the first and second sections 210, 220. Billet leaf bundles 230 travel up along a conveyor 212 in the first section 210 towards the transition point 250, and then pass through the transition point 250 onto the conveyor 212 in the second section 220 that move the billet leaf bundles 230 away from the transition point 250. The speed of the conveyor 212 can be fast enough to cause the billet leaf bundles 230 to temporarily be airborne as they fly over the transition point 250 from the steeper (greater slope) first section 210 to the flatter, less-steep (less slope) second section 220.

Here and elsewhere in the disclosure it is mentioned that the billet leaf bundles can be airborne when acted upon by various embodiments of cleaning and debris management systems. Having the crop or billet leaf bundles dynamic or airborne when acted upon by the charged air stream(s) of a cleaning and debris management system helps the system remove extraneous matter, debris and leaf material from the billet leaf units or bundles. When the bundles are airborne, the material mixture changes orientation and tumbles in space which creates a high potential for further debris extraction with the added charged air streams. Presenting the same charged air streams to a stationary/static bundle relative to the elevator slats typically results in minimal leaf/debris extraction and reduced material preparation for further downstream processing.

The air source 252 is positioned at the transition point 250 to blow under the billet leaf bundles 230 as they pass over the transition point 250 to further dislodge debris 236 from the billets. The air flow from the air source 252, indicated by arrows F, provides additional billet leaf separation as the cane traverses over the transition point 250 to help separate lighter debris and leafy material 236 from heavier billets 234 of the billet leaf bundles 232. Additionally, this process can spread out the billet leaf bundles 232 (make them thinner, less dense) before they are presented to the secondary extractor 160 and/or other transition points for additional cleaning. Spreading out the billet leaf bundles 232 before they come to the secondary extractor 160 is a desirable advantage compared to existing methods for cleaning. Debris and leafy material 236 that is not extracted by supplemental air source 252 on the elevator 212 will be "prepped", "prepared", and highly susceptible for extraction by the secondary extractor 160. Thinner, more spread out, billet leaf bundles 232 with an increased surface area allows for more efficient debris extraction by the secondary extractor 160. Thus, the secondary extractor 160 can more effectively remove the debris 236 from the billet leaf bundles 232 before the billets 234 drop from the secondary extractor 160 into the wagon.

Various embodiments of the air source 252 will be described later in this application. The elevator 200 can include one or more transition points 250 that each have an air source 252 blowing through the billet leaf bundles 230 as they pass over that transition point 250 to further dislodge debris and leafy material 236 from the billet leaf bundles 230. Having the billet leaf bundles 230 be dynamic or airborne while the air source 252 blows through the billet leaf bundles 230 helps to more effectively separate the lighter debris 236 from the heavier billets 234 in the billet leaf bundles 230.

Figure 3:
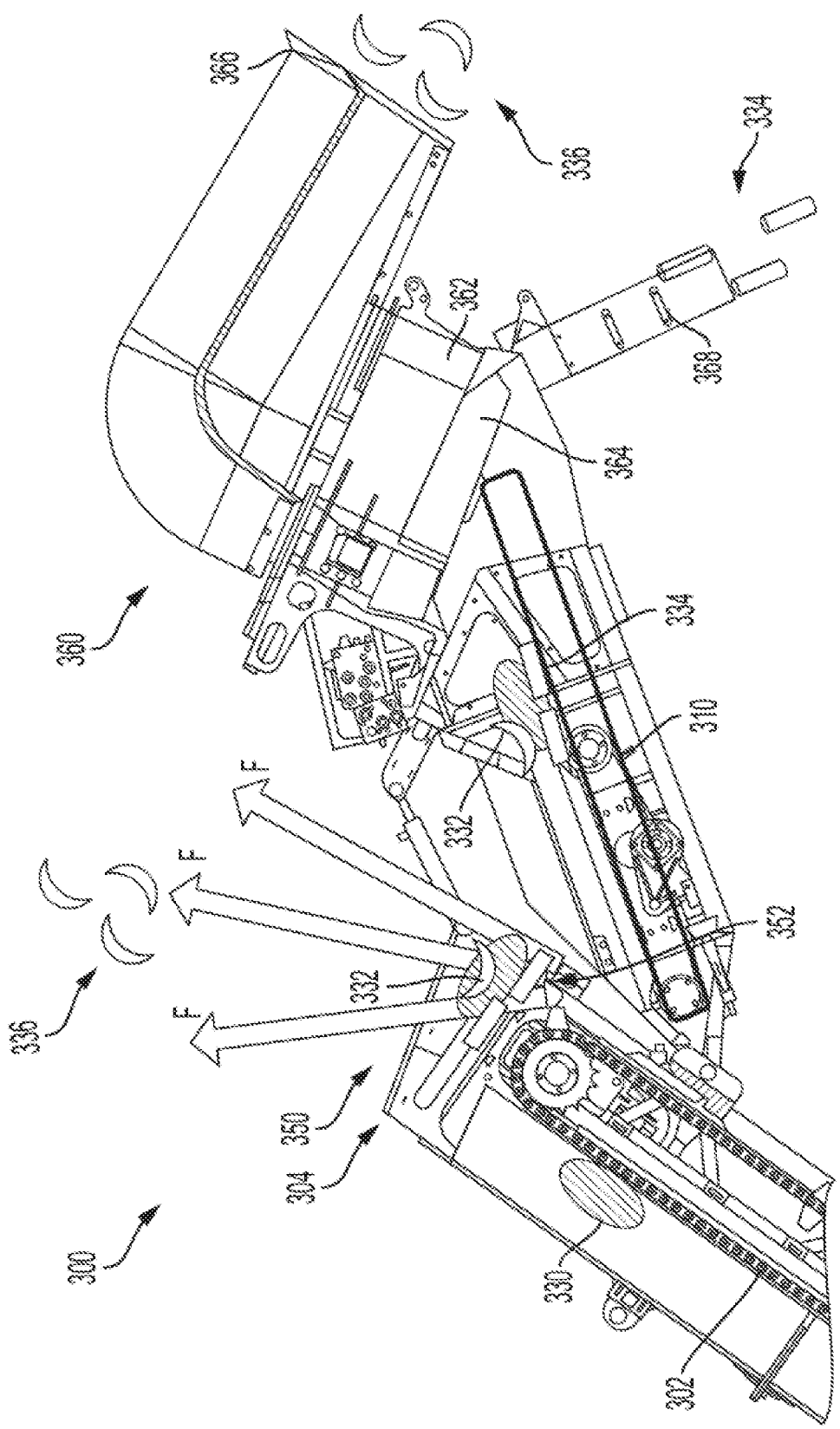
FIG. 3 illustrates an exemplary embodiment of a cleaning and debris management system with an air source located at a transition point at the top of an elevator where billet leaf bundles fall from the elevator conveyor onto a secondary conveyor that moves the billet leaf bundles towards a secondary extractor.

FIG. 3 illustrates another exemplary embodiment of a cleaning and debris management system with an air source 352 located at a transition point 350 at the top 304 of an exemplary elevator 300. The elevator 300 includes a first conveyor 302 that moves billet leaf bundles 330 towards the transition point 350 at the top 304 of the elevator 300. At the transition point 350, the billet leaf bundles 330 fall from the first conveyor 302 onto a second conveyor 310 that moves the billet leaf bundles 330 past a secondary extractor 360.

The air source 352 is positioned at the transition point 350 between the first conveyor 302 and the second conveyor 310 so that as the billet leaf bundles 330 fall from the first conveyor 302 onto the second conveyor 310, the air source 352 blows through the billet leaf bundles 330 to further dislodge debris and leafy material 336 from the billets 330. The air flow from the air source 352, indicated by arrows F, helps separate lighter debris and leafy material 336 from the billets 334 by blowing the lighter debris and leafy material 336 out towards the top of and away from the heavier billets 334 which settle towards the bottom. This further separation enables the secondary extractor 360 to more effectively extract the debris and leafy material 336 from the billet leaf bundles 332 before the billets 334 drop from the secondary extractor 360 into the wagon.

The secondary extractor 360 includes an extractor fan 362, an air inlet 364, a debris outlet 366, and a billet outlet 368. The extractor fan 362 is configured to pull air through the billet leaf bundles 332 as they pass by on the second conveyor 310. The air flow from the extractor fan 362 further dislodges the lighter debris and leafy material 336 from the billet leaf bundles 332 and pulls the lighter debris and leafy material 336 into the air inlet 364 and expels it out of the air outlet 366. The billets 334 of the billet leaf bundles 332 are typically heavier than the debris 336 and resist being pulled by the extractor fan 362 into the air inlet 364. The lighter debris loads on the elevator 300 due to the added cleaning of the supplemental air sources 252 and/or 352 can enable operators to run the secondary extractor fans 362 at lower rotations-per-minute (RPMs) and thus prevent/reduce secondary extractor billet losses. The billets 334 pass by on the second conveyor 310 to fall into the billet outlet 368 and into the wagon.

Various embodiments of the air source 352 will be described later in this application. Having the billet leaf bundles 330 be airborne as they fall at the transition point 350 from the first conveyor 302 onto the second conveyor 310 while the air source 352 blows through the billet leaf bundles 330 helps to more effectively separate the lighter debris and leafy material 336 from the heavier billets 334 in the billet leaf bundles 330.

Figure 4:
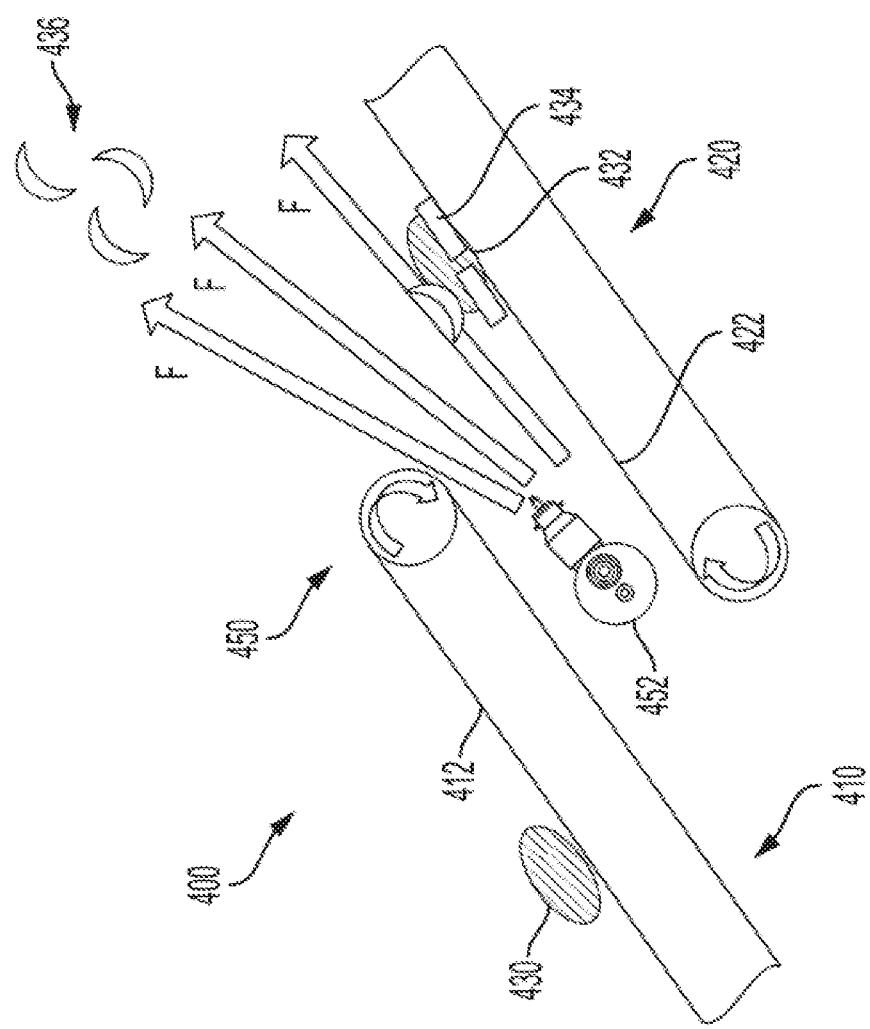
FIG. 4 illustrates another exemplary embodiment of a cleaning and debris management system with an air source located at a transition point of an elevator that includes separate first and second conveyors, where billet leaf bundles fall from the first conveyor onto the second conveyor.

FIG. 4 illustrates yet another exemplary embodiment of a cleaning and debris management system with an air source 452 located at a transition point 450 of an exemplary elevator 400, where the elevator 400 includes a first section 410 and a separate second section 420. The first section 410 includes a first conveyor 412, and the second section 420 includes an second conveyor 422. Billet leaf bundles 430 travel up along the conveyor 412 of the first section 410 towards the transition point 450 where the billet leaf bundles 430 fall from the first conveyor 412 of the first section 410 onto the second conveyor 422 of the second section 420 that moves the billet leaf bundles further towards a top of the elevator 400. The billet leaf bundles 430 are airborne as they fall at the transition point 450 from the first conveyor 412 to the second conveyor 422.

The air source 452 is positioned to blow through the billet leaf bundles 430 as they fall from the first conveyor 412 to the second conveyor 422 to further dislodge debris 436 from the billets 434. The air flow, indicated by arrows F, from the air source 452 helps separate the lighter debris and leafy material 436 from the heavier billets 434 to form further separated billet leaf bundles 432. The further separated billet leaf bundles 432 have the lighter debris and leafy material 436 blown towards the top and away from the heavier billets 434 which typically settle towards the bottom of the billet leaf bundles 432.

The elevator 400 can include one or more transition points 450 that each have an air source 452 blowing through the billet leaf bundles 430 as they fall from a first conveyor of a first section to a second conveyor of a second section at that transition point 450 to further dislodge debris and leafy material 436 from the billet leaf bundles 430. Having the billet leaf bundles 430 airborne while the air source 452 blows through the billet leaf bundles 430 helps to more effectively separate the lighter debris and leafy material 436 from the heavier billets 434 in the billet leaf bundles 430. Various different air sources can be used at the one or more transition points 450. A single airflow source can provide airflow to multiple air sources 452 at one or more transition points 450, or each transition point 450 can have an independent airflow source compared to the others.

Figure 5:
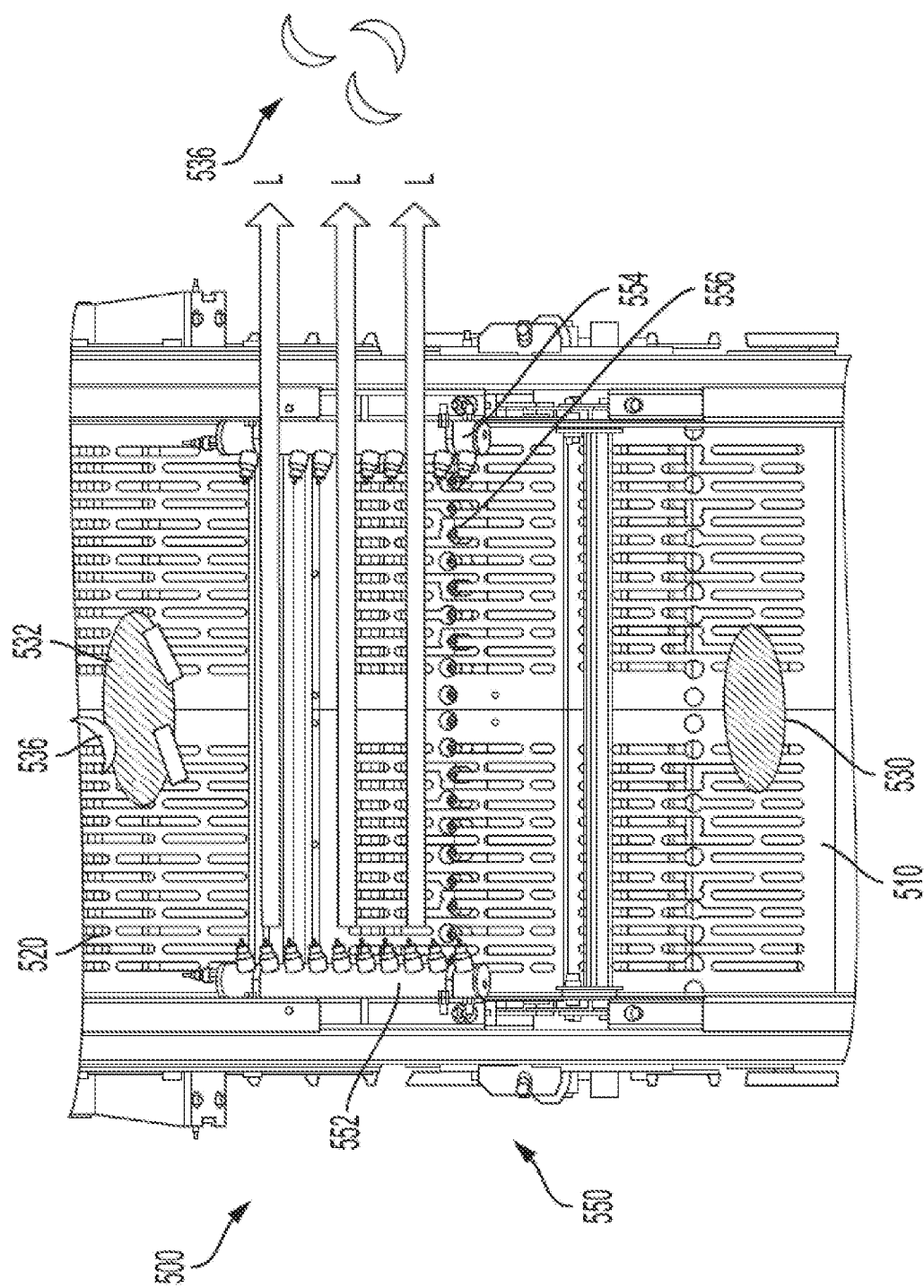
FIG. 5 illustrates exemplary lateral air sources that can be located at any of the transition points of FIGS. 2-4 as part of the cleaning and debris management system.

FIG. 5 illustrates a portion of an exemplary cleaning and debris management system with a transition point 550 that includes exemplary lateral and upward air sources. The air sources include a first lateral air source 552 located on the left side of the transition point 550, a second lateral air source 554 located on the right side of the transition point 550, and an upward air source 556 located below the conveyor or between conveyors near the transition point 550. One or more lateral air sources, like lateral air sources 552, 554, can be located at any transition point as part of a cleaning and debris management system, for example at any of transition points 250, 350, 450, etc. FIG. 5 illustrates an exemplary elevator 500, that includes a first conveyor 510 that transports billet leaf bundles 530 towards the transition point 550, a second conveyor 520 that transports the billet leaf bundles further towards a top of the elevator 500. The first and second conveyors 510, 520 can be part of the same conveyor as shown in FIG. 2, or can be part of separate conveyors as shown in FIGS. 3 and 4.

The billet leaf bundles 530 travel up along the first conveyor 510 to the transition point 550. At the transition point 550, the upward air source 556 (see also FIGS. 2-4) blows through the billet leaf bundles 530 to dislodge lighter debris and leafy material 536 from heavier billets 534 and the lighter debris and leafy material 536 blown into the air. The air flow L from the lateral air source 552 blows laterally across the transition point 550 from one side to the opposite side of the elevator 500 to blow the lighter debris and leafy material 536 away from the billet leaf bundles 532 and off the elevator 500. FIG. 5 shows the first lateral air source 552 mounted on the left side of the elevator 500 and activated to blow left-to-right across the elevator 500 to blow the debris and leafy material 536 off the right side of the elevator 500. FIG. 5 also shows the second lateral air source 554 mounted on the right side of the elevator 500 so that, when it is activated the second lateral air source 554 blows right-to-left across the elevator 500 to blow the debris and leafy material 536 off the left side of the elevator 500. Any one or more of the air sources 552, 554, 556 can be activated as desired.

The air flow L from the lateral air source 552 blows the lighter debris 536 off the first and second conveyors 510, 520 so as to not fall back on trailing or progressing billet leaf bundles 532 along the elevator pathway. Furthermore, the lateral airflow can also help prevent the extracted matter from being dropped onto the unharvested crop adjacent to the harvesting machine, and from being dropped onto the harvesting machine. For example, if the unharvested crop is on the left side of the elevator 500, the first lateral air source 552 can be activated (as shown in FIG. 5) to blow the debris and leafy material 536 off the right side of the elevator 500 away from the unharvested crop. Alternatively, if the unharvested crop is on the right side of the elevator 500, the second lateral air source 554 can be activated to blow the debris and leafy material 536 off the left side of the elevator 500 away from the unharvested crop. In other situations, it may be desired to have both the lateral air sources 552, 554 activated at the same time. The further separated billet leaf bundles 532 travel along the second conveyor 520 away from the transition point 550.

Various types of air sources can be used for the lateral air sources 552, 554. The elevator 500 can include one or more transition points 550, and any or all of the transition points 550 can include a lateral air sources 552, 554 to blow away lighter debris and leafy material 536 that is separated from the billet leaf bundles 532 as they pass over that transition point 550. The lateral air sources 552, 554 can direct and place the separated debris 536 away from the harvester crop in the elevator and away from the unharvested rows adjacent to the harvesting machine. The lateral air sources 552, 554 can also assist in dislodging the debris and leafy material 536 from the billet leaf bundles 532.

Figure 6A:
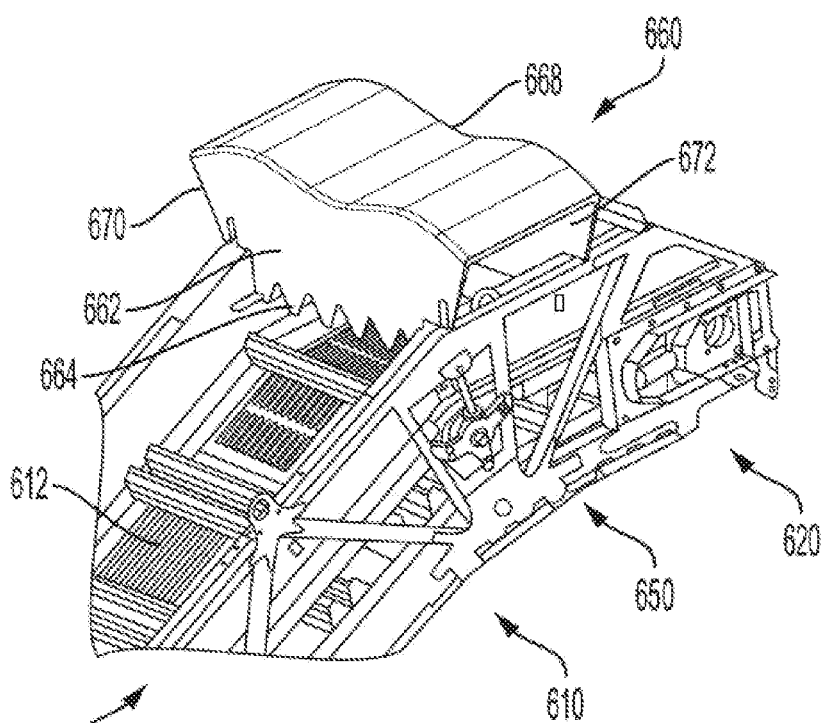
FIG. 6A illustrates an exemplary cleaning and debris management system with a hood that includes an irregular base edge and two outlets that can be located at any of the transition points of FIGS. 2-4 as part of the cleaning and debris management system.
Figure 6B:
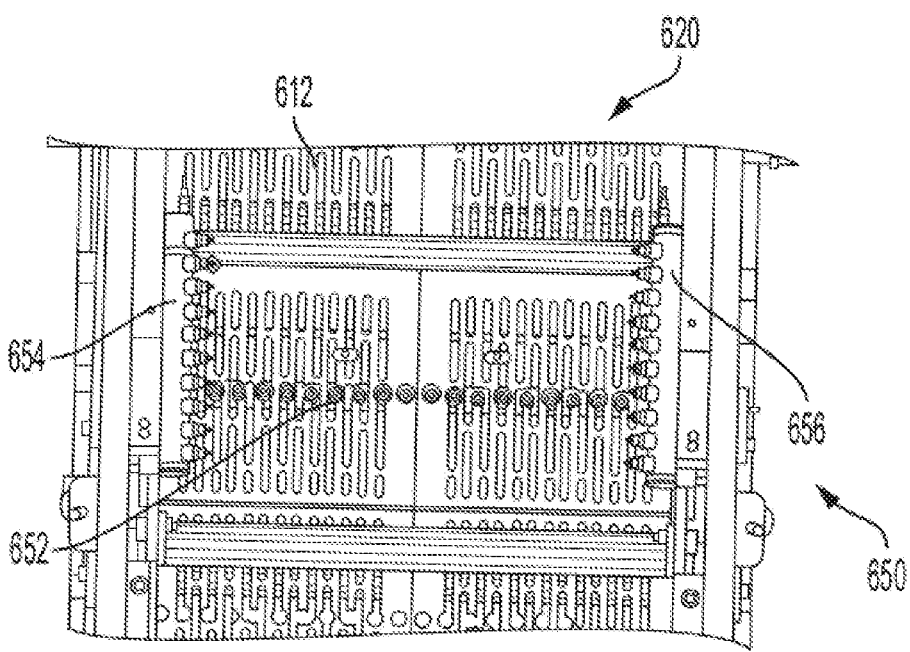
FIG. 6B illustrates the exemplary cleaning and debris management system of FIG. 6A with the hood removed to show the air sources and other structures beneath the hood.
Figure 15:
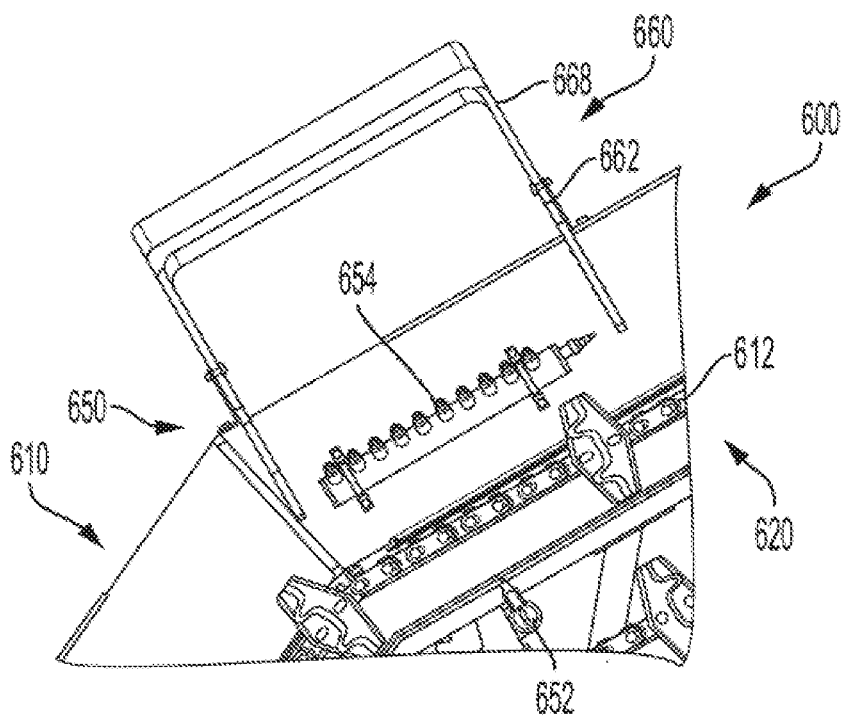
FIG. 15 illustrates a cross-section of the cleaning and debris management system of FIG. 6A where the cut is vertical through the hood and the elevator.

FIGS. 6A, 6B and 15 illustrate an exemplary embodiment of a cleaning and debris management system similar to that shown in FIG. 2 but with a hood 660 coupled to an exemplary elevator 600. FIG. 6A illustrates the hood 660 on the elevator 600, FIG. 6B illustrates the hood removed to show air sources and other structures beneath the hood 660, and FIG. 15 illustrates a cross-section where the cut is vertical through the hood 660 and the elevator 600. The cleaning and debris management system includes one or more air sources 652, 654, 656 on the exemplary elevator 600. The elevator 600 includes a first section 610 and an second section 620 that meet at a transition point 650, where the first section 610 has a steeper slope than the second section 620. Billet leaf bundles travel up along a conveyor 612 in the first section 610 towards the transition point 650, and then pass through the transition point 650 onto the conveyor 612 in the second section 620 that moves the billet leaf bundles away from the transition point 650. The speed of the conveyor 612 in the first section 610 can be fast enough to cause the billet leaf bundles to temporarily be airborne as they fly over the transition point 650 from the steeper, greater slope first section 610 to the flatter, less slope second section 620.

The hood 660 is located at the transition point 650, and the air sources 652, 654, 656 are located under the hood 660. The hood 660 includes a base section 662 and an upper section 668 with a first outlet 670 and a second outlet 672. The base section 662 attaches to the elevator 600 at or near the transition point 650. The upper section 668 can be directable such that the outlets 670, 672 can be directed in a desired direction. The base section 662 can have a scalloped or irregular edge 664 configured to hit the top of billet leaf bundles as they come to the hood 660. The scalloped or irregular shaped edge 664 can help spread and loosen the billet leaf bundles to create a thinner mat of billet leaf bundle as it enters the hood 660. The larger surface area of the thinner billet leaf bundles enables the one or more air sources 652, 654, 656 to more effectively separate and extract or blow away debris and leafy material from billets as they pass over the transition point 650.

One or more of the air sources 652, 654, 656 can be activated to help separate and blow away debris and leafy material from billets as they pass over the transition point 650. The upward air source 652 is configured to blow up from under the conveyor 612 into the base 662 of the hood 660 under the billet leaf bundles as they pass over the transition point 650. The first lateral air source 654 is configured to blow across the conveyor 612 from left-to-right into the hood 660 towards the second outlet 672 to blow lighter debris and leafy material away from the billets and out the second outlet 672 of the hood 660 as the billet leaf bundles pass over the transition point 650. The second lateral air source 656 is configured to blow across the conveyor 612 from right-to-left into the hood 660 towards the first outlet 670 to blow lighter debris and leafy material away from the billets and out the first outlet 670 of the hood 660 as the billet leaf bundles pass over the transition point 650.

At the transition point 650, the upward air source 652 blows up from under the conveyor 612 into the base 662 of the hood 660 under the billet leaf bundles as they pass over the transition point 650 to help blow lighter debris and leafy material towards the top and away from the heavier billets. Simultaneously, one or more of the lateral air sources 654, 656 can blow the lighter debris and leafy material out the outlets 670, 672 of the hood 660. When the upper section 668 of the hood 660 is directable, the outlets 670, 672 can be directed to direct the air flow with the debris away from the elevator 600, away from the wagon for collecting the billets and away from any uncut crop yet to be harvested. In the embodiment shown in FIG. 6, if the desired direction to blow the debris is out the first outlet 670 of the hood 660, then the second lateral air source 656 can be activated and the first lateral air source 654 deactivated to blow the debris in the desired direction. Alternatively, if the desired direction to blow the debris is out the second outlet 672 of the hood 660, then the first lateral air source 654 can be activated and the second lateral air source 656 deactivated to blow the debris in the desired direction. Each of the air sources 652, 654, 656 can be independently activated and deactivated by the operator.

One or more of the cleaning and debris management system embodiments shown in FIGS. 2-6 can be used in an elevator of an agricultural harvester. Cleaning and debris management systems can include one or more lateral airflow sources, one or more upward airflow sources, or combinations of lateral and upward airflow sources. The cleaning and debris management system embodiments can augment the crop cleaning of the primary and secondary extractors, or alternatively the cleaning and debris management system embodiments can replace the secondary extractor. Replacing the secondary extractor, which is located at the top and the end of the elevator, can alleviate large weight/stresses on the ends of the elevator creating a more balanced/stable harvesting machine. In addition, the power consumption of the cleaning and debris management system can be less than the power consumption of the secondary extractor. Charged or compressed air supplies can be attached to the body of the harvester and used to power one or more of the air sources of the cleaning and debris management system. Using charged air systems along the elevator pathway instead of a secondary extractor may also reduce field losses or billet losses that can occur when using a secondary extractor.

Figure 7:
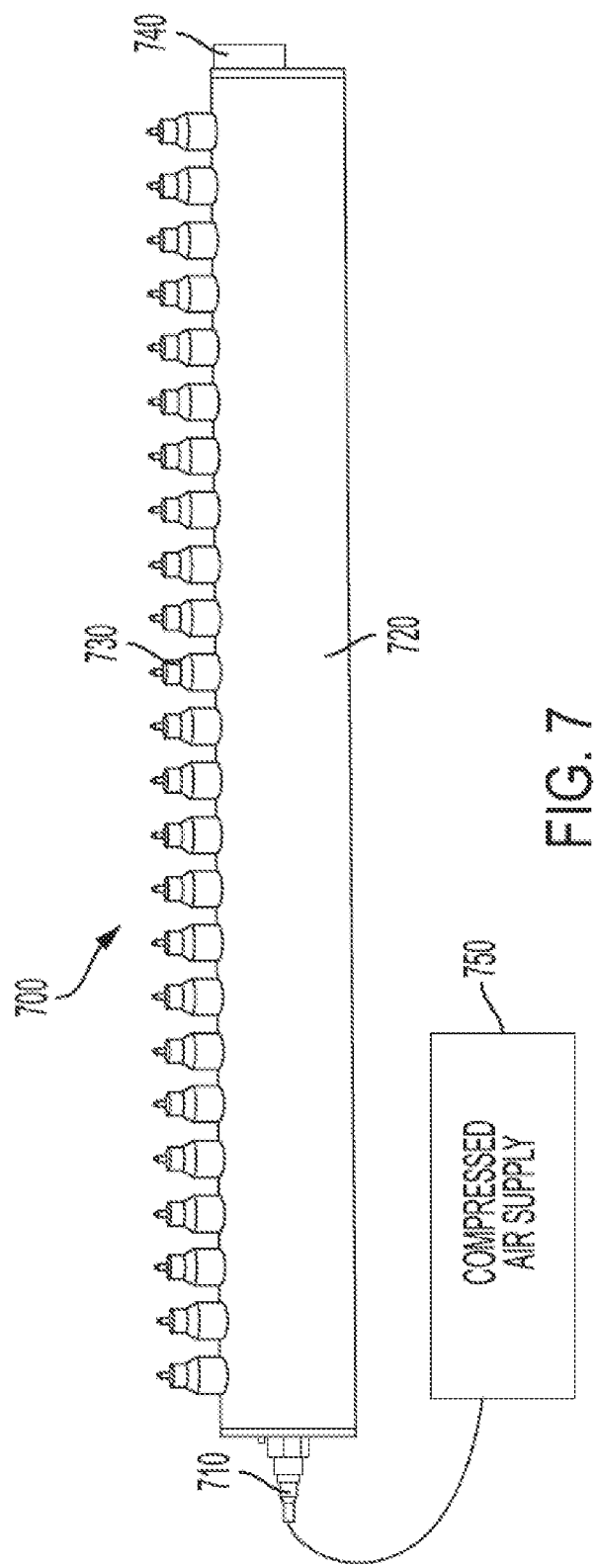
FIG. 7 illustrates an exemplary embodiment of an air source that can be used at a transition point as an upward/outward blowing air source or as a lateral air source.
Figure 8:
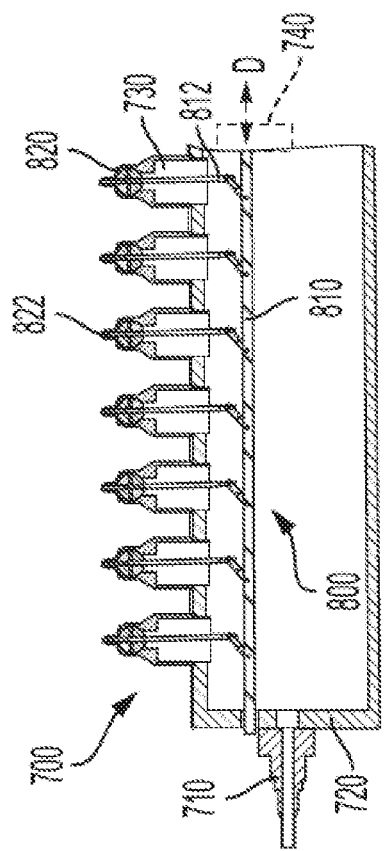
FIG. 8 illustrates a cross section of a portion of the air source shown in FIG. 7.
Figure 10:
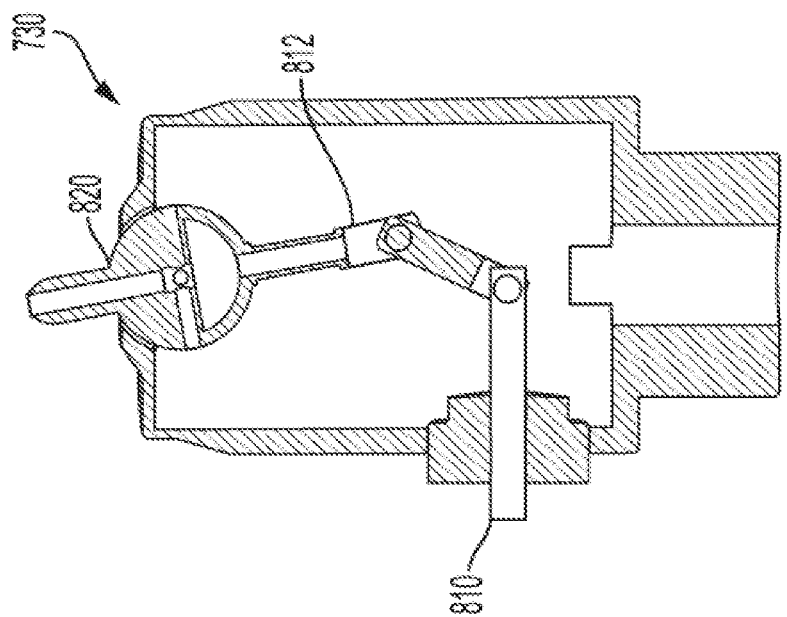
FIG. 10 illustrates a cross section of the outlet nozzle of the air source shown in FIG. 9.
Figure 9:
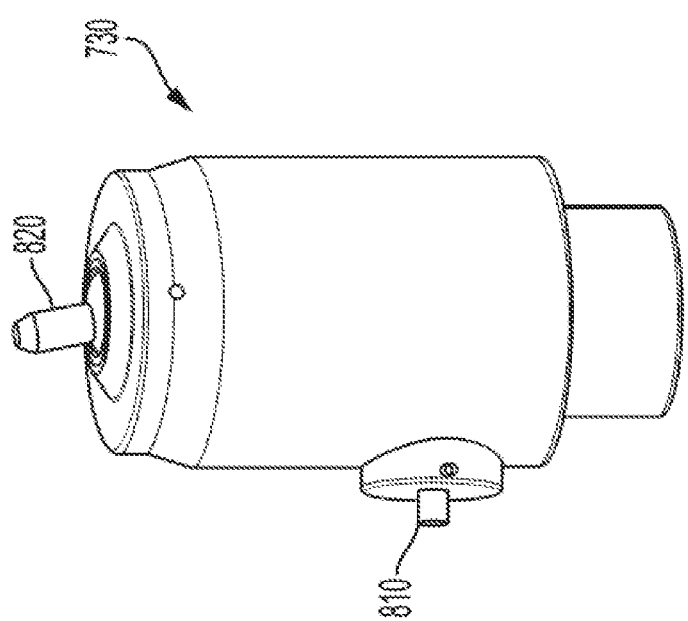
FIG. 9 illustrates an individual outlet nozzle of the air source shown in FIG. 7.

FIGS. 7-10 illustrate an exemplary embodiment of a charged air source 700 with multiple outlet nozzles 730. FIG. 7 illustrates the exemplary charged air source 700 with multiple outlet nozzles 730; FIG. 8 illustrates a cross section of a portion of the air source 700 and the outlet nozzles 730; FIG. 9 illustrates an individual outlet nozzle 730; and FIG. 10 illustrates a cross section of the individual outlet nozzle 730.

The air source 700 can be used at a transition point as a vertical or upward blowing air source (for example air sources 252, 352, 452, 652) or as a lateral air source (for example air sources 552, 554, 654, 656). The air source 700 includes an inlet 710, a valve body or manifold 720 and a plurality of outlet nozzles 730. A compressed air supply 750 provides air to the inlet 710 which directs the air into the manifold 720. The air flows from the manifold 720 out the outlet nozzles 730. The pressure of the air from the compressed air supply 750 can be adjusted manually or automatically to adjust the force of the air flow blowing from the outlet nozzles 730. The air source 700 can also include a directional motor 740.

The cross-sections of FIGS. 8 and 10 illustrate a directional mechanism 800 to direct the direction of the air flow from the outlet nozzles 730 of the air source 700. Each of the outlet nozzles 730 includes an adjustment arm 812 connected to an adjustable head 820. The adjustment arms 812 of the outlet nozzles 730 are coupled to an adjustment rod 810. By moving the adjustment rod 810, all of the adjustment arms 812 and adjustable heads 820 of the outlet nozzles 730 are moved. In this way the adjustment rod 810 can be adjusted to point the adjustable heads 820 of the outlet nozzles 730 in a desired direction, and have the air source 700 blow air in the desired direction for cleaning. The directional motor 740 can be configured to automatically move the adjustment rod 810 in and out, as shown by arrow D, to point the adjustable heads 820 of the outlet nozzles 730 in a desired direction.

Figure 11:
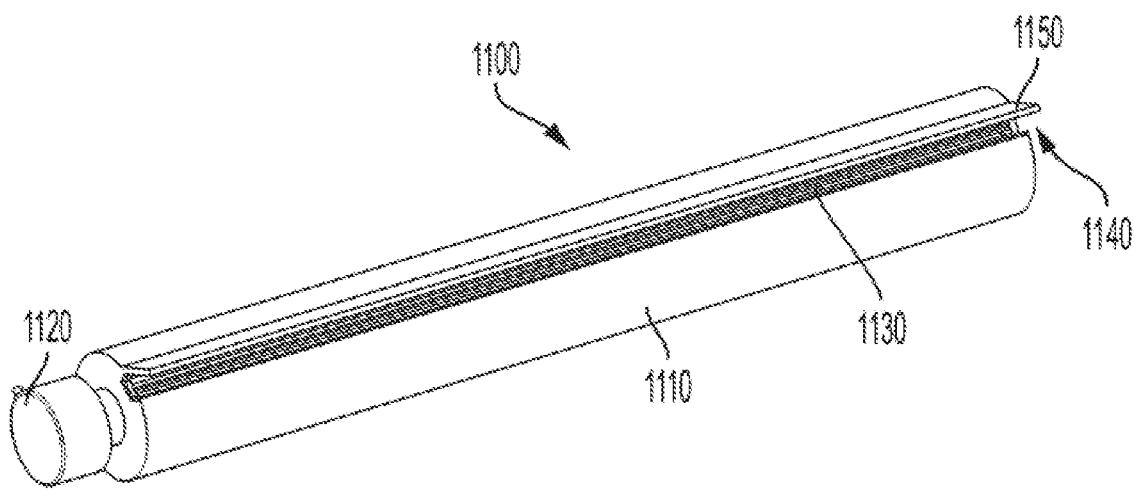
FIG. 11 illustrates an exemplary embodiment of a cross flow fan that can be used as an air source.
Figure 12:
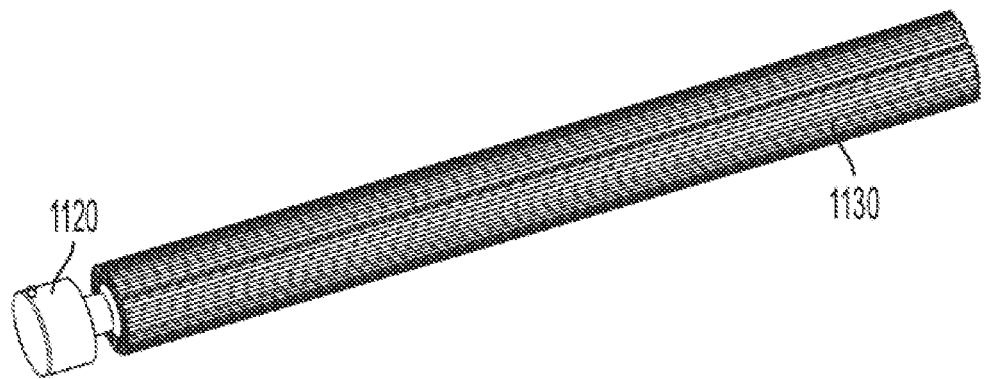
FIG. 12 illustrates the cross flow fan of FIG. 11 without the housing.

FIGS. 11 and 12 illustrate an exemplary embodiment of a cross flow fan 1100 that can be used as a charged air source or supply. The cross flow fan 1100 includes a housing 1110, a motor 1120, an impeller 1130 and an air outlet 1140 with a fin 1150. FIG. 12 illustrates the cross flow fan 1100 with the housing 1110 removed. The motor 1120 turns the impeller 1130 in the housing 1110, and the impeller 1130 blows air out the air outlet 1140. The speed of the motor 1120 can be controlled, increased or decreased, to control the speed of the impeller 1130 and control the speed or pressure of the air coming out of the air outlet 1140. The fin 1150 can help direct the air flow coming out of the air outlet 1140. In some embodiments the housing 1110 can rotate which enables the air outlet 1140 to be moved and provides further control over the airflow direction from the cross flow fan 1100.

Figure 13:
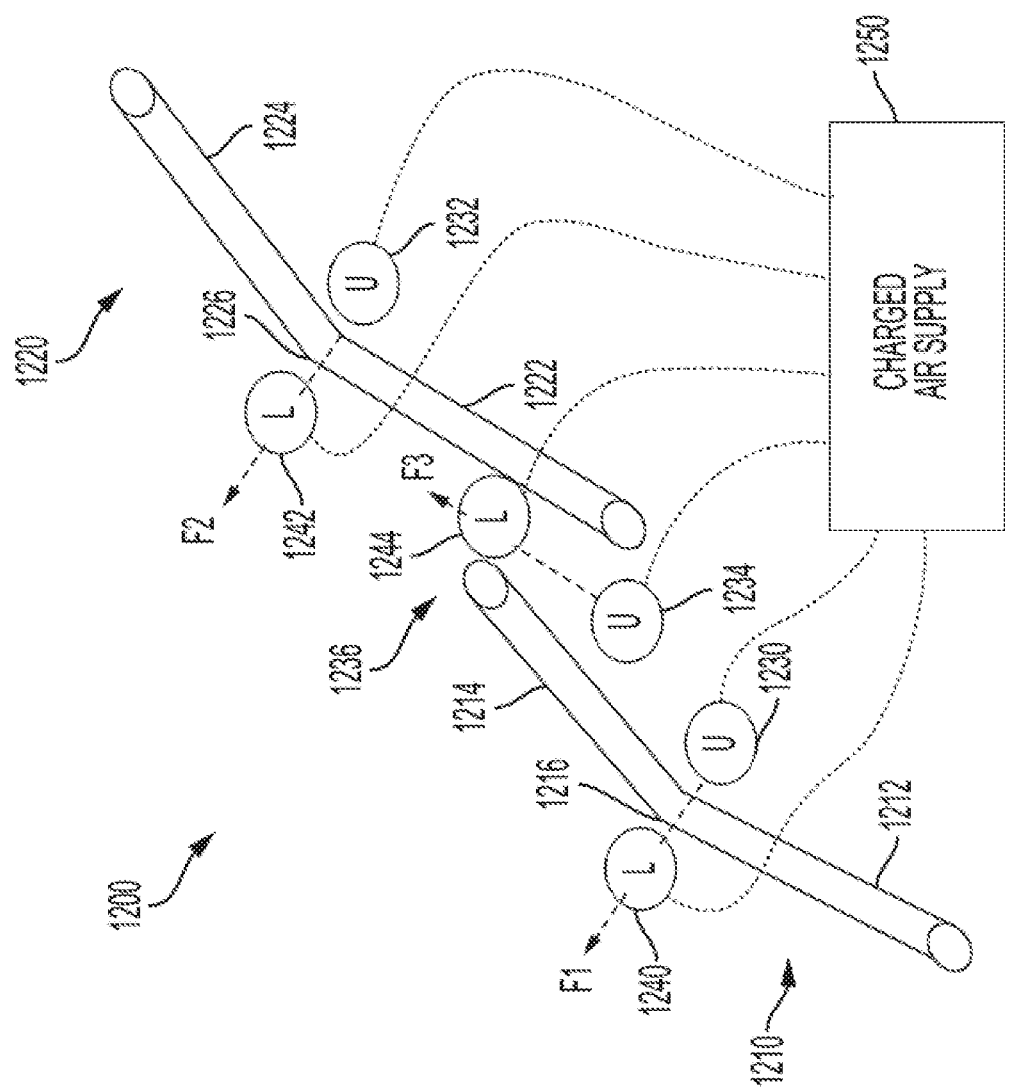
FIG. 13 illustrates an exemplary embodiment of a cleaning and debris management system on an elevator with multiple conveyors and multiple air sources.

FIG. 13 illustrates an exemplary embodiment of a cleaning and debris management system on an elevator 1200 with multiple air sources. The elevator 1200 includes a first conveyor 1210 and an second conveyor 1220. The first conveyor 1210 includes a first section 1212 and a second section 1214 that meet at a first transition point 1216, where the first section 1212 has a greater slope than the second section 1214. The second conveyor 1220 includes a first section 1222 and a second section 1224 that meet at a second transition point 1226, where the first section 1222 has a greater slope than the second section 1224. The first and second conveyors 1210, 1220 are positioned such that billet leaf bundles travel up to the top end of the first conveyor 1210 to a third transition point 1236. At the third transition point 1236, the billet leaf bundles drop from the second section 1214 of the first conveyor 1210 to the first section 1222 of the second conveyor 1220, and then continue to travel up from the first section 1222 to the second section 1224 of the second conveyor 1220.

The multiple air sources of the cleaning and debris management system include upward air sources 1230, 1232 and 1234; and lateral air sources 1240, 1242 and 1244. The lower upward air source 1230 is positioned below the first conveyor 1210 at the first transition point 1216, and is configured to blow air in the direction indicated by dashed arrow F1 through the first transition point 1216 to help separate lighter debris from billet leaf bundles as they pass over the first transition point 1216. The upper upward air source 1232 is positioned below the second conveyor 1220 at the second transition point 1226, and is configured to blow air in the direction indicated by dashed arrow F2 through the second transition point 1226 to help separate lighter debris from billet leaf bundles as they pass over the second transition point 1226. The third upward air source 1234 is positioned at the third transition point 1236, and is configured to blow air in the direction indicated by dashed arrow F3 at the location where billet leaf bundles fall from the second section 1214 of the first conveyor 1210 onto the first section 1222 of the second conveyor 1220.

The lower lateral air source 1240 is positioned above the first conveyor 1210 at the first transition point 1216, and is configured to blow air laterally across the first conveyor 1210 at the first transition point 1216 to help further separate lighter debris from billet leaf bundles as they pass over the first transition point 1216. The upper lateral air source 1242 is positioned above the second conveyor 1220 at the second transition point 1226, and is configured to blow air laterally across the second conveyor 1220 at the second transition point 1226. The third lateral air source 1244 is positioned at the third transition point 1236, and is configured to blow air laterally at the location where billet leaf bundles fall from the second section 1214 of the first conveyor 1210 onto the first section 1222 of the second conveyor 1220.

Billet leaf bundles travel up along the first conveyor 1210 from the first section 1212 towards the transition point 1216, and then pass over the transition point 1216 onto the second section 1214 that move the billet leaf bundles away from the transition point 1216. The speed of the first conveyor 1210 can be fast enough to cause the billet leaf bundles to temporarily be airborne as they fly over the transition point 1216 from the steeper (greater slope) first section 1212 to the flatter (less slope) second section 1214. While the billet leaf bundles are airborne as they fly over the first transition point 1216, the lower upward air source 1230 blows up through the billet leaf bundles to push lighter debris higher above the first conveyor 1210, and the lower lateral air source 1240 blows across the first conveyor 1210 to blow the lighter debris away from the billet leaf bundles. A hood can be positioned at the transition point 1216 to help direct the flow of extracted debris.

The billet leaf bundles then travel up along the second section 1214 of the first conveyor 1210 to the transition point 1236 where they fall from the first conveyor 1210 to the second conveyor 1220. While the billet leaf bundles are falling from the first conveyor 1210 to the second conveyor 1220 at the transition point 1236, the third upward air source 1234 blows through the billet leaf bundles to separate lighter debris from the heavier billets, and the third lateral air source 1244 blows across the elevator 1200 to blow the lighter debris away from the billet leaf bundles. A hood can be positioned at the transition point 1236 to help direct the flow of extracted debris.

The billet leaf bundles then travel up along the second conveyor 1220 from the first section 1222 towards the transition point 1226, and then pass over the transition point 1226 onto the second section 1224 that moves the billet leaf bundles away from the transition point 1226. The speed of the second conveyor 1220 can be fast enough to cause the billet leaf bundles to temporarily be airborne as they fly over the transition point 1226 from the steeper (greater slope) first section 1222 to the flatter (less slope) second section 1224. While the billet leaf bundles are airborne as they fly over the transition point 1226, the upper upward air source 1232 blows up through the billet leaf bundles to push lighter debris higher above the second conveyor 1220, and the upper lateral air source 1242 blows across the second conveyor 1220 to blow the lighter debris away from the billet leaf bundles. A hood can be positioned at the transition point 1226 to help direct the flow of extracted debris.

The multiple air sources of the cleaning and debris management system can each have separate and independent charged air supplies, or have a common charged air supply that supplies charged air to one or more of the upward and lateral air sources 1230, 1232, 1234; 1240, 1242, 1244. FIG. 13 illustrates a single charged air supply 1250 that supplies charged air to each of the upward air sources 1230, 1232, 1234 and each of the lateral air sources 1240, 1242, 1244. Alternatively, there can be more than one charged air supply to provide charged air to the upward and lateral air sources.

Figure 14:
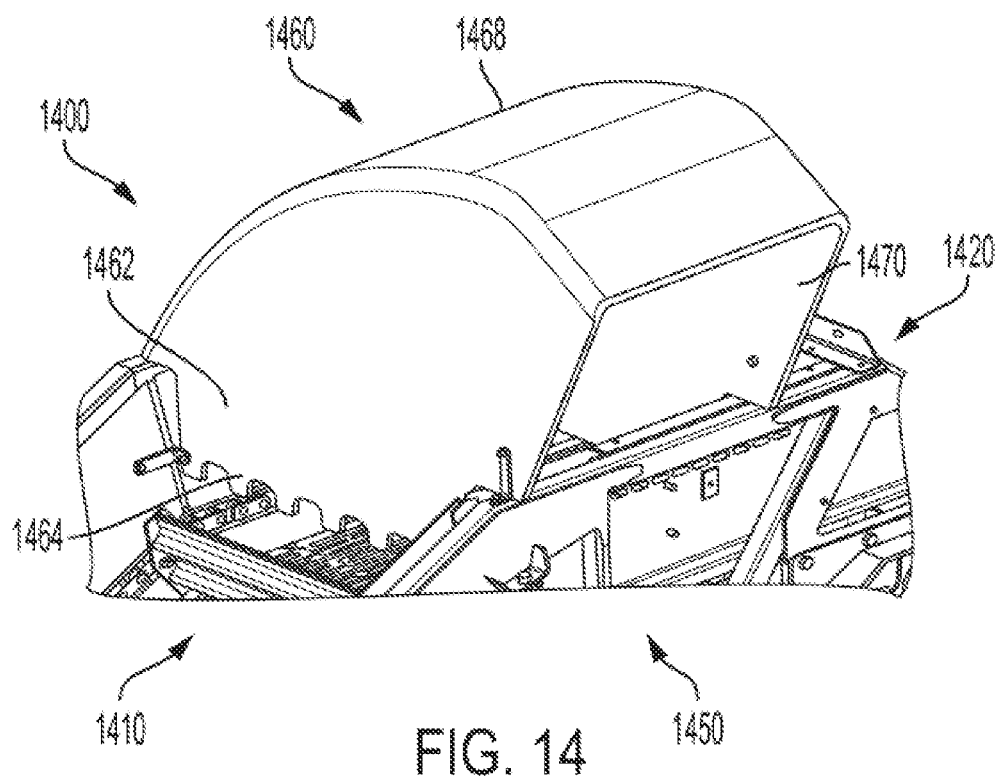
FIG. 14 illustrates an embodiment of a cleaning and debris management system similar to FIG. 6 but with an alternative embodiment of a hood with an irregular base edge and one outlet.

FIG. 14 illustrates an embodiment of a cleaning and debris management system similar to that shown in FIG. 6 but with an alternative embodiment of a hood 1460 coupled to an exemplary elevator 1400. The cleaning and debris management system can include one or more air sources 652, 654, 656 as shown in FIG. 6B. The elevator 1400 includes a first section 1410 and an second section 1420 that meet at a transition point 1450, where the first section 1410 has a steeper slope than the second section 1420. Billet leaf bundles travel up along the conveyor in the first section 1410 towards the transition point 1450, and then pass through the transition point 1450 onto the conveyor in the second section 1420 that moves the billet leaf bundles away from the transition point 1450. The speed of the conveyor in the first section 1410 can be fast enough to cause the billet leaf bundles to temporarily be airborne as they fly over the transition point 1450 from the steeper, greater slope first section 1410 to the flatter, less slope second section 1420.

The hood 1460 is located at the transition point 1450, and the air sources 652, 654, 656 are located under the hood 1460. The hood 1460 includes a base section 1462 and an upper section 1468 with an outlet 1470. The base section 1462 attaches to the elevator 1400 at or near the transition point 1450. The upper section 1468 can be directable such that the outlets 1470 can be directed in a desired direction. The base section 1462 can have a scalloped or irregular edge 1464 configured to hit the top of billet leaf bundles as they come to the hood 1460. The scalloped or irregular shaped edge 1464 can help spread and loosen the billet leaf bundles to create a thinner mat of billet leaf bundle as it enters the hood 1460. The larger surface area of the thinner billet leaf bundles enables the one or more air sources 652, 654, 656 to more effectively separate and extract or blow away debris and leafy material from billets as they pass over the transition point 1450.

As billet leaf bundles enter the hood 1460, the scalloped edge 1464 can help thin, spread and loosen the billet leaf bundles. The upward air source 652 blows up from under the conveyor into the base 1462 of the hood 1460 under the billet leaf bundles as they pass over the transition point 1450 to help blow lighter debris and leafy material towards the top and away from the heavier billets. When the outlet 1470 is directed to the right (as shown in FIG. 14), then the first lateral air source 654 can be activated and the second lateral air source 656 deactivated to blow the debris out the outlet 1470 to the right. When the outlet 1470 is directed to the left (opposite what as shown in FIG. 14), then the second lateral air source 656 can be activated and the first lateral air source 654 deactivated to blow the debris out the outlet 1470 to the left.

Figure 16:
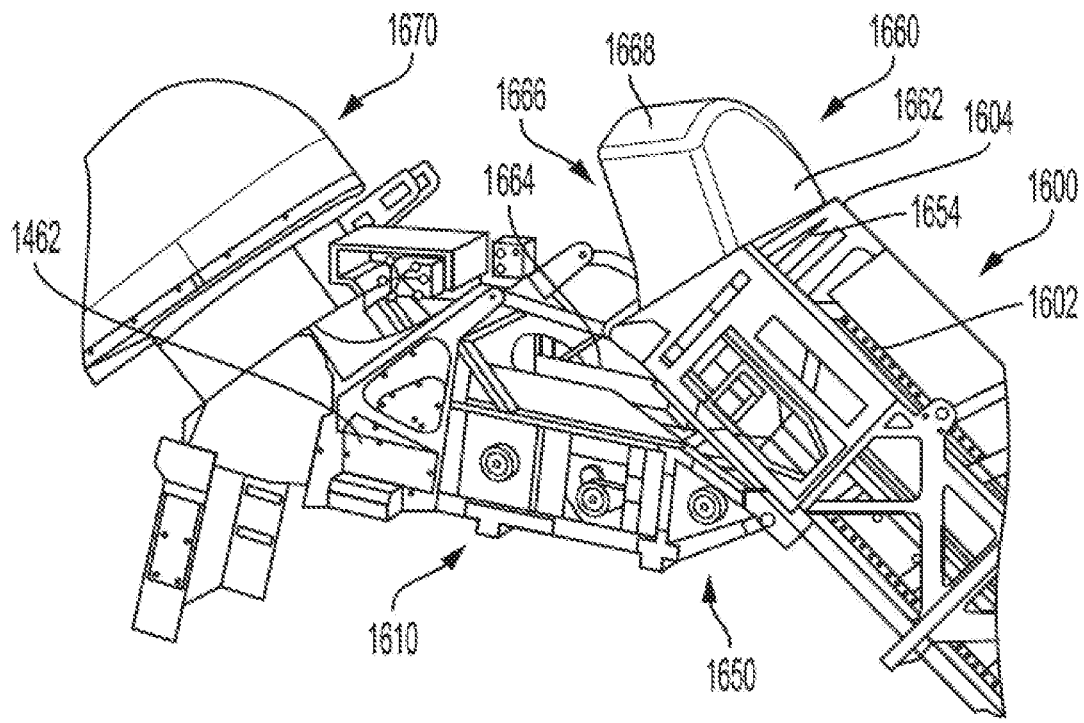
FIG. 16 illustrates a cleaning and debris management system with a hood that includes a deflector plate.
Figure 17:
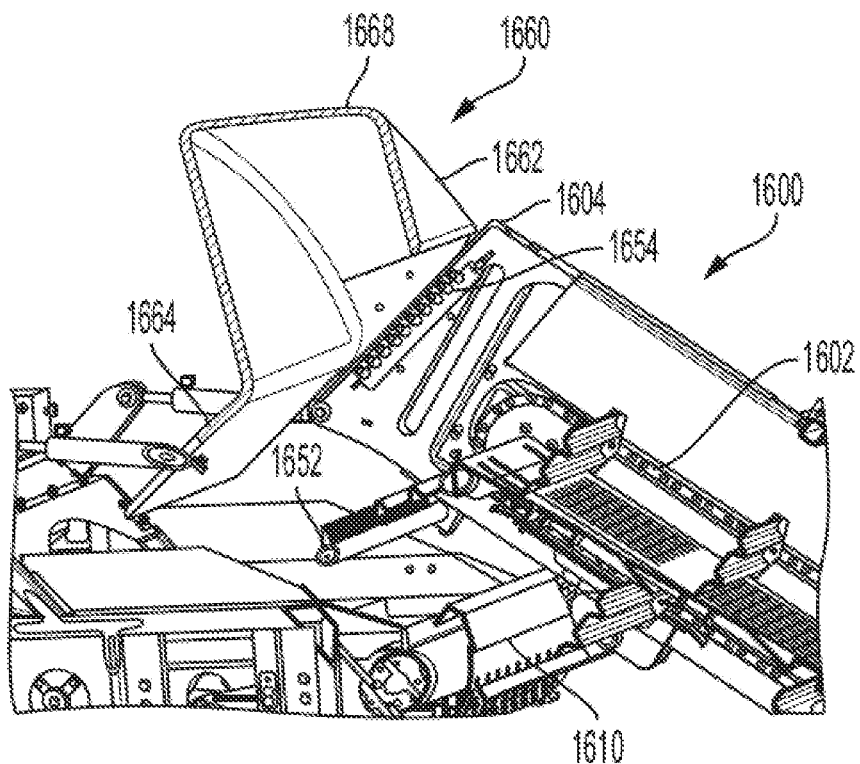
FIG. 17 illustrates a cross-section of the cleaning and debris management system of FIG. 16 where the cut is vertical through the hood and the elevator.

FIGS. 16 and 17 illustrate a cleaning and debris management system with another embodiment of a hood 1660 coupled to an exemplary elevator 1600. FIG. 16 illustrates the hood 1660 at a top 1604 of on the elevator 1600 at a transition point 1650, and FIG. 17 illustrates a cross-section where the cut is vertical through the hood 1660 and the elevator 1600. The cleaning and debris management system can include one or more air sources 1652, 1654. The elevator 1600 includes a first conveyor 1602 that moves billet leaf bundles towards the transition point 1650 at the top 1604 of the elevator 1600. At the transition point 1650, the billet leaf bundles fall from the first conveyor 1602 onto an second conveyor 1610 that moves the billet leaf bundles past a secondary extractor 1670.

The hood 1660 is located at or near the transition point 1650. The hood 1660 includes a base section 1662 with a deflector plate 1664, and an upper section 1668 with an outlet 1666. The base section 1662 attaches to the elevator 1600 at or near the transition point 1650. The upper section 1668 can be directable such that the outlet 1666 can be directed in a desired direction. The speed of the first conveyor 1602 can be fast enough to propel the billet leaf bundles of the top of the first conveyor 1602 into the deflector plate 1664 of the base section 1662 of the hood 1660. Hitting the deflector plate 1664 can help breakup and loosen the billet leaf bundles as they fall from the first conveyor 1602 to the second conveyor 1610 so the one or more air sources 1652, 1654 can more effectively separate and blow away debris and leafy material from billets as they pass over the transition point 1650.

The upward air source 1652 is positioned at the transition point 1650 between the first conveyor 1602 and the second conveyor 1610 so that as the billet leaf bundles hit the deflector plate 1664 and fall from the first conveyor 1602 onto the second conveyor 1610, the upward air source 1652 blows under the billet leaf bundles to further dislodge debris and leafy material from the billets. The lateral air source 1654 is positioned at the transition point 1650 below the hood 1660 so that as the billet leaf bundles hit the deflector plate 1664 and fall from the first conveyor 1602 onto the second conveyor 1610, the lateral air source 1654 blows through the billet leaf bundles to further dislodge debris and leafy material from the billets and blows the debris out the outlet 1666 of the hood 1660. The air flow from the air sources 1652, 1654 help separate lighter debris and leafy material from the billets which enables the secondary extractor 1670 to more effectively remove the debris and leafy material from the billet leaf bundles before the billets drop from the secondary extractor 1670 into the wagon.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A cleaning and debris management system that separates debris from billet leaf bundles in a harvester, the cleaning and debris management system comprising:
    an elevator comprising a conveyor that includes a first section, a second section and a transition point between the first and second sections, the conveyor being continuous between the first section and second section, the elevator configured to move billet leaf bundles up the elevator from the first section across the transition point to the second section;
    an upward air source located at the transition point below at least a portion of the elevator, and configured to blow air through the billet leaf bundles from beneath as the billet leaf bundles move across the transition point from the first section to the second section of the elevator;

wherein the air blown by the upward air source is configured to spread out the billet leaf bundles and separate the debris from the billet leaf bundles.

2. The cleaning and debris management system of claim 1, wherein the elevator causes the billet leaf bundles to become airborne as the billet leaf bundles move across the transition point from the first section to the second section of the elevator, and the upward air source is configured to blow air through the billet leaf bundles while the billet leaf bundles are airborne.

3. The cleaning and debris management system of claim 2, wherein the elevator further comprises a first conveyor in the first section, and a second conveyor in the second section, where the second conveyor is separate from the first conveyor;

wherein the billet leaf bundles fall from the first conveyor onto the second conveyor as the billet leaf bundles move across the transition point from the first section to the second section of the elevator; and wherein the upward air source is configured to blow air through the billet leaf bundles as the billet leaf bundles fall from the first conveyor onto the second conveyor.

4. The cleaning and debris management system of claim 2, wherein the elevator further comprises a conveyor that extends across both the first and second sections of the elevator;

wherein the conveyor has a first slope in the first section and a second slope in the second section, and the first slope is greater than the second slope such that the billet leaf bundles become airborne as they move across the transition point from the first section to the second section of the elevator; and wherein the upward air source is configured to blow air through the billet leaf bundles as the billet leaf bundles are airborne at the transition point.

5. The cleaning and debris management system of claim 2, further comprising:

a lateral air source located at the transition point and configured to blow air across the elevator from one of the right and left sides of the elevator to the other of the right and left sides of the elevator;

wherein the lateral air source is configured to blow air across the billet leaf bundles while the billet leaf bundles are airborne at the transition point to spread out the billet leaf bundles and separate and remove the debris from the billet leaf bundles.

6. The cleaning and debris management system of claim 1, further comprising:

a hood that includes a base and an outlet, the base coupled to the elevator;

wherein the upward air source is configured to blow air into the base and out the outlet of the hood such that at least a portion of the debris separated from the billet leaf bundles is blown out of the outlet of the hood.

7. The cleaning and debris management system of claim 6, wherein the hood further comprises a directable upper section coupled to the base, and the outlet is part of the directable upper section;

wherein the directable upper section of the hood is movable to direct the outlet and the portion of the debris blown out of the outlet in a desired direction.

8. The cleaning and debris management system of claim 7, wherein the upward air source comprises:

a compressed air supply; and a plurality of outlet nozzles coupled to the compressed air supply;

wherein each of the plurality of outlet nozzles is configured to blow air supplied by the compressed air supply.

9. The cleaning and debris management system of claim 8, wherein each of the plurality of outlet nozzles includes a directable head configured to blow air in a desired direction.

10. The cleaning and debris management system of claim 9, wherein the upward air source includes an adjustment arm configured to adjust the directable head of all of the plurality of outlet nozzles of the upward air source.

11. The cleaning and debris management system of claim 2, further comprising a lateral air source located at the transition point and configured to blow air across the elevator from one of the right and left sides of the elevator to the other of the right and left sides of the elevator;

wherein the elevator further comprises a first conveyor in the first section, and a second conveyor in the second section, where the second conveyor is separate from the first conveyor;

wherein the billet leaf bundles fall from the first conveyor onto the second conveyor as the billet leaf bundles move across the transition point from the first section to the second section of the elevator;

wherein the upward air source is configured to blow air through the billet leaf bundles and the lateral air source is configured to blow air across the billet leaf bundles while the billet leaf bundles fall from the first conveyor onto the second conveyor to spread out the billet leaf bundles and separate and remove the debris from the billet leaf bundles.

12. The cleaning and debris management system of claim 2, further comprising a lateral air source located at the transition point and configured to blow air across the elevator from one of the right and left sides of the elevator to the other of the right and left sides of the elevator;

wherein the elevator further comprises a conveyor that extends across both the first and second sections of the elevator;

wherein the conveyor has a first slope in the first section and a second slope in the second section, and the first slope is greater than the second slope such that the billet leaf bundles become airborne as they move across the transition point from the first section to the second section of the elevator; and wherein the lateral air source is configured to blow air across the billet leaf bundles as the billet leaf bundles are airborne at the transition point.

13. The cleaning and debris management system of claim 2, further comprising a hood that includes a base and an outlet, the base coupled to the elevator;

wherein the elevator further comprises a conveyor that extends across both the first and second sections of the elevator;

wherein the conveyor has a first slope in the first section and a second slope in the second section, and the first slope is greater than the second slope such that the billet leaf bundles become airborne as they move across the transition point from the first section to the second section of the elevator;

wherein the upward air source is configured to blow air through the billet leaf bundles as the billet leaf bundles are airborne at the transition point to separate the debris from the billet leaf bundles; and wherein the upward air source is configured to blow air into the base and out the outlet of the hood such that at least a portion of the debris separated from the billet leaf bundles is blown out of the outlet of the hood.

14. The cleaning and debris management system of claim 2, further comprising a hood that includes a base and a first outlet, the base coupled to the elevator;
   wherein the elevator further comprises a first conveyor in the first section, and a second conveyor in the second section, where the second conveyor is separate from the first conveyor;
   wherein the billet leaf bundles fall from the first conveyor onto the second conveyor as the billet leaf bundles move across the transition point from the first section to the second section of the elevator;
   wherein the upward air source is configured to blow air through the billet leaf bundles as the billet leaf bundles fall from the first conveyor onto the second conveyor to separate the debris from the billet leaf bundles; and
   wherein the upward air source is configured to blow air into the base and out the first outlet of the hood such that at least a portion of the debris separated from the billet leaf bundles is blown out of the first outlet of the hood.

15. The cleaning and debris management system of claim 14, further comprising a first lateral air source located at the transition point and configured to blow air across the elevator and towards the first outlet of the hood;
   wherein the first lateral air source is configured to blow air across the billet leaf bundles while the billet leaf bundles fall from the first conveyor onto the second conveyor and to blow the debris separated from the billet leaf bundles out the first outlet of the hood.

16. The cleaning and debris management system of claim 15, wherein the hood further comprises a second outlet directed in a different direction than the first outlet, and the cleaning and debris management system further comprises a second lateral air source located at the transition point and configured to blow air across the elevator and towards the second outlet of the hood;
   wherein the second lateral air source is configured to blow air across the billet leaf bundles while the billet leaf bundles fall from the first conveyor onto the second conveyor and to blow the debris separated from the billet leaf bundles out the second outlet of the hood.

17. The cleaning and debris management system of claim 14, wherein the hood further comprises a deflector plate;
   wherein the first conveyor is configured to propel the billet leaf bundles into the deflector plate as the billet leaf bundles fall from the first conveyor onto the second conveyor to separate the debris from the billet leaf bundles; and
   wherein the upward air source is configured to blow air through the billet leaf bundles when they hit the deflector plate and to blow at least a portion of the debris separated from the billet leaf bundles out of the first outlet of the hood.

18. The cleaning and debris management system of claim 14, wherein the base of the hood further comprises an irregular-shaped edge configured to hit the billet leaf bundles as the billet leaf bundles enter the hood.

19. A cleaning and debris management system that separates debris from billet leaf bundles in a harvester, the cleaning and debris management system comprising:
   an elevator comprising an endless conveyor that includes a plurality of sections and a plurality of transition points, the endless conveyor being continuous between each of the plurality of sections, where two of the plurality of sections meet at each of the plurality of transition points;
   a plurality of air sources configured to blow air through the billet leaf bundles at the plurality of transition points as the billet leaf bundles move across the plurality of transition points as the billet leaf bundles move along the elevator;
   a charged air supply coupled to each of the plurality of air sources, the charged air supply configured to supply charged air to each of the plurality of air sources to blow air through the billet leaf bundles at the plurality of transition points.

20. The cleaning and debris management system of claim 19, wherein the plurality of air sources comprises:
   one or more upward air sources, each of the one or more upward air sources located at an associated one of the plurality of transition points below at least a portion of the elevator; and
   one or more lateral air sources, each of the one or more lateral air sources located at an associated one of the plurality of transition points;
   wherein each of the one or more upward air sources is configured to blow air through the billet leaf bundles from beneath as the billet leaf bundles move across the associated one of the plurality of transition points; and
   wherein each of the one or more lateral air sources is configured to blow air across the billet leaf bundles while the billet leaf bundles move across the associated one of the plurality of transition points.

* * * * *